United States Patent [19]
Hoffmann

[11] 3,876,215
[45] Apr. 8, 1975

[54] VERSATILE TOOL HOLDER

[76] Inventor: John T. Hoffmann, 1604 Greenleaf, Allentown, Pa. 18103

[22] Filed: May 28, 1974

[21] Appl. No.: 474,014

Related U.S. Application Data

[60] Division of Ser. No. 393,075, Aug. 30, 1973, Pat. No. 3,835,666, and a continuation-in-part of Ser. No. 327,646, Jan. 29, 1973, , which is a division of Ser. No. 173,418, Aug. 20, 1971, Pat. No. 3,727,771.

[52] U.S. Cl. ................................ 279/16; 82/37
[51] Int. Cl. ................................ B23b 5/22
[58] Field of Search ............ 64/6, 9 A; 279/16, 1 L, 279/1 J; 82/37

[56] References Cited
UNITED STATES PATENTS

| | | | |
|---|---|---|---|
| 2,441,052 | 5/1948 | Wilmer | 64/9 A |
| 2,445,634 | 7/1948 | Plumb | 82/37 |
| 2,711,664 | 6/1955 | Misuraca | 82/37 |
| 2,767,564 | 10/1956 | Green | 64/6 |
| 3,735,605 | 5/1973 | Hoffman | 64/6 |
| 3,740,063 | 6/1973 | Smith | 279/16 X |

*Primary Examiner*—Andrew R. Juhasz
*Assistant Examiner*—W. R. Briggs
*Attorney, Agent, or Firm*—Fred Fisher

[57] ABSTRACT

The versatile tool holder is used in a conventional vertical drill press, a horizontal milling machine, a lathe, or similar rotating machinery.

In one embodiment, the tool holder is used in a conventional drill press, horizontal milling machine, or a tail stock of a lathe. The tool holder includes two substantially cylindrical housings, each housing having a generally T-shaped cross-section. Each housing has, at its large diameter face, a substantially planar surface having a plurality of pockets therewithin oriented about a circle concentric with its axis. The corresponding pockets of the housings receive, respectively, a ball bearing. An axial passageway at the planar faces of each of the two housings receive a member of generally cylindrical shape having a first groove circumferentially disposed near one end thereof and a second groove circumferentially disposed near the other end thereof. Each of the housings has a plurality of radial orifices extending from the exterior of the housing, through to the respective axial passageway, so as to house corresponding set screws, resilient means, and ball bearing. The ball bearings are urged against the various grooves of the cylindrical member. One of the two housings has a male thread thereon, the other has an inverted truncated conical portion on its exterior surface. By applying a sleeve nut having a corresponding male thread at one end thereof and a corresponding taper at the opposite end thereof, the two housings are rigidly coupled together when the sleeve nut is tightened, and are coupled together in a floating relationship when the sleeve nut is loosened.

6 Claims, 8 Drawing Figures

3,876,215
PATENTED APR 8 1975
SHEET 1 OF 3
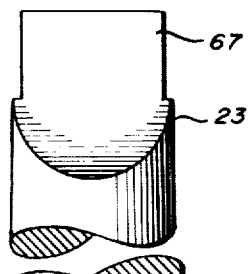
Fig.1
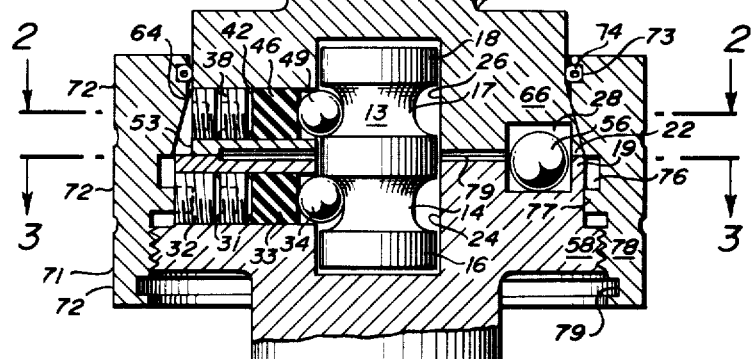
Fig.2
Fig.3

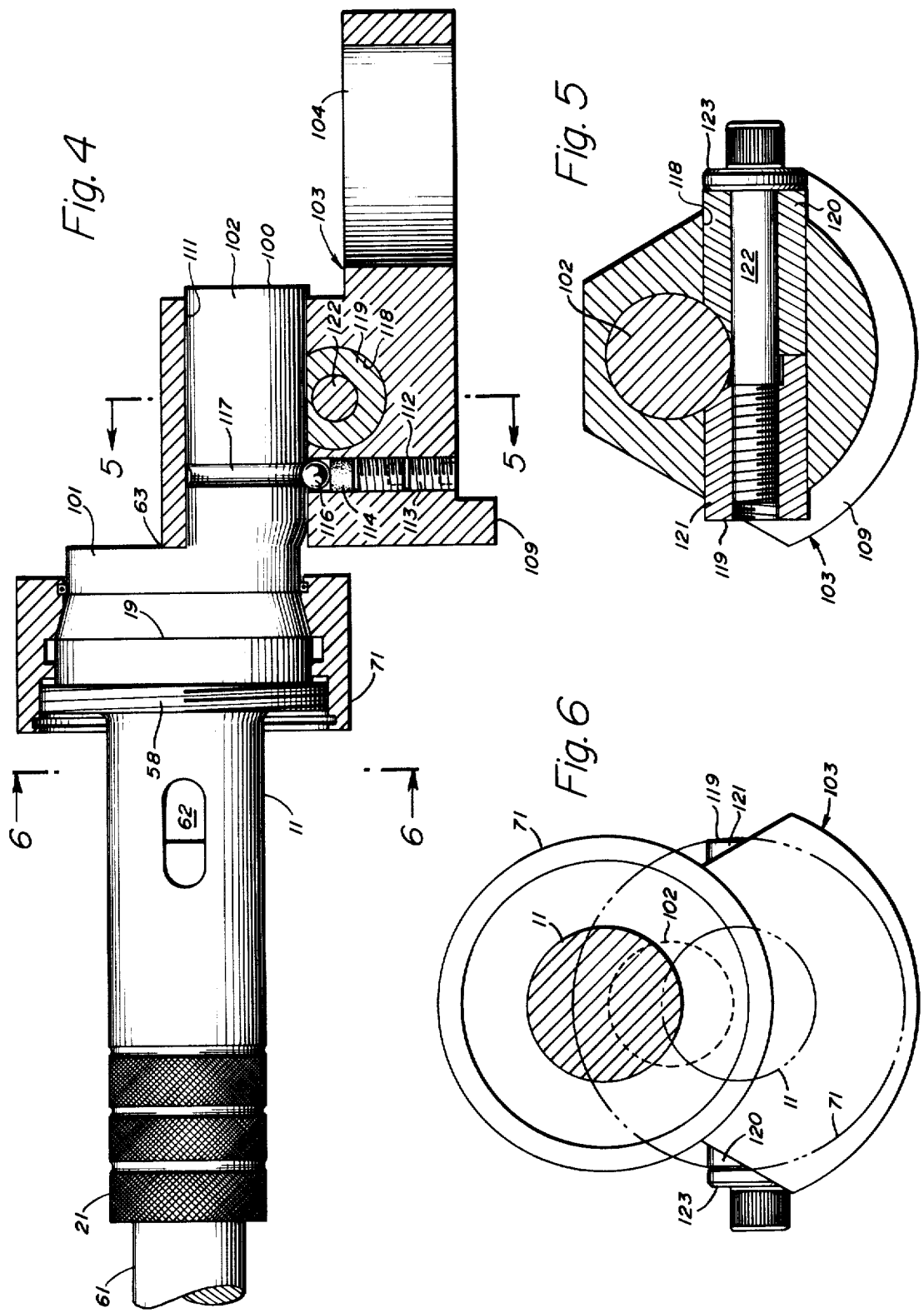

VERSATILE TOOL HOLDER

This is a division, of application Ser. No. 393,075, filed 08/30/73 now U.S. Pat. No. 3,835,666; and a continuation-in-part of Ser. No. 327,646, filed Jan. 29, 1973. Such application, Ser. No. 327,646, is a division of application Ser. No. 173,418 filed Aug. 20, 1971, now U.S. Pat. No. 3,727,771, issued Apr. 17, 1973.

BACKGROUND OF THE INVENTION

1. Field of the Invention

This invention relates to tool holders and, in particular, to novel tool holders which are, selectively, rigid and floating. Accordingly, the general objects of the invention are to provide new and improved tool holders of such character.

2. Description of the Prior Art

During the course of a preliminary novelty search performed on behalf of the inventor, the following United States Patents of interest were found:

| U.S. Pat. No. | Inventor(s) | Issue Date |
| --- | --- | --- |
| 553,265 | Scholer | Jan. 21, 1896 |
| 1,317,008 | Dohner et al. | Sept. 23, 1919 |
| 1,424,535 | Watts | Aug. 1, 1922 |
| 1,782,633 | Schiltz | Nov. 25, 1930 |
| 1,907,447 | Schiltz | May 9, 1933 |
| 2,188,205 | Osborne | Jan. 23, 1940 |
| 2,193,615 | Ashley | March 12, 1940 |
| 2,399,807 | Jones | May 7, 1946 |
| 2,416,586 | Jones | Feb. 25, 1947 |
| 2,468,396 | Frisco | April 26, 1949 |
| 2,865,642 | Kelsey | Dec. 23, 1958 |
| 3,077,352 | Van Straaten | Feb 12, 1963 |
| 3,364,798 | Giraldin | Jan. 23, 1968 |
| 3,735,605 | Hoffman | May 29, 1973 |

Scholer, U.S. Pat. No. 553,265, discloses a chuck for watch crowns, wherein the chuck has a conical center for the purpose of holding a variety of different sized crowns which are held by a cap.

Dohner et. al., U.S. Pat. No. 1,317,008, discloses a floating tool holder, stating that it can also be used as a solid holder by aligning the tool with the work, and then tightening a cap. Coupling ribs in Dohner et. al. slide in matching grooves.

Watts, U.S. Pat. No. 1,424,535, discloses a floating tool chuck having components including off-sets which slide in corresponding grooves. Although ball bearings are added, the Watts disclosure is similar to Dohner Et. al.

Schlitz, U.S. Pat. No. 1,782,633, discloses a flexible driving connection for tool holders, which are floating devices that cannot be made rigid.

Hoffman, U.S. Pat. No. 3,735,605, issued May 29, 1973 to the applicant of this invention, discloses a coupling for permitting a driving shaft to drive a driven shaft, though the two shafts ae not exactly co-aligned. Various features of the coupling disclosed in the Hoffman patent are useful in the tool holder described hereinbelow.

The remaining patents disclose tool holders or chucks including a sleeve nut with an internal taper and some similarities in construction to portions of applicant's novel tool holder.

The most pertinent subclasses of those searched were: Class 279, subclasses 16 and 18.

SUMMARY OF THE INVENTION

This invention is directed to a tool holder, which can be made both floating and rigid, for use vertically in a drill press, or for use horizontally in a horizontal milling machine or a lathe. The novel tool holder provides for designs which allow for the feed pressure to exactly centralize with and equal the coupling pressure. When the feed pressure is free within determined limits to move angularly and/or radially, the path of least resistance is the shortest distance between the feed pressure and cutting pressure.

When the rotation of a work piece or tool is on the same axial line as the feed pressure and cutting pressure, less tool wear occurs and less power is required to perform a given amount of work. Conventional machine tools, in the past, could not achieve a common axial line between feed pressure, cutting pressure, and/or rotation of the work piece or tool. Mis-alignment was created by the working clearances, however slight, built into a machine tool. The mis-alignment factor increases in portion to the in-service wear of the machine tool.

With this invention, the novel tool head (or tool "holder," as used throughout the specification) eliminates the tool wear and the destruction caused by mis-alignment. With this invention, conservation of critically scarce alloys and elements that are used in manufacturing drills, reamers, and the like, are conserved.

Hence, it is an object of this invention to provide new and improved drill holders which are, selectively, rigid and floating, and can be used vertically and horizontally in rotating machinery.

Yet another object of this invention is to provide new and improved drill holders which permit the feed pressure to exactly centralize with and equal the cutting pressure.

Still another object of this invention is to provide new and improved drill holders which operate so as to cause tool wear to be substantially reduced.

In accordance with this invention, a tool holder is selectively changed from a rigid to floating condition, and vice versa.

In one embodiment, the tool holder includes a first generally cylindrically shaped housing which has a plurality of flat bottomed formed pockets reposed about a generally planar face thereof in a predetermined configuration. This first housing has a male thread on its cylindrical surface. The holder further includes a second generally cylindrically shaped housing having a plurality of flat bottomed formed pockets reposed about a planar face thereof. These pockets are in a mirror image configuration with respect to the predetermined configuration. The second housing has a truncated conical portion adjacent to the cylindrical portion of the second housing. The truncated conical portion of the housing is located distant from the planar face thereof. The holder further includes a like plurality of ball bearings. Each ball bearing resides, at least partially, within a corresponding one of the pockets. The holder includes an elongated member having a pair of circumferential grooves disposed at opposite ends of the member; first and second pluralities of resiliently biased ball bearings for urging against one and the other, respectively, of the grooves. Means are associated with the first housing for retaining the first plurality of ball bearings and for holding the member for non-axial movement with respect thereto. Means are associated with the second housing for retaining the second plurality of ball bearings and for holding the member for non-axial movement with respect thereto. Also, the tool holder includes a sleeve nut which has an internal tapered portion which is adapted to engage with the truncated conical portion of the second housing. The sleeve nut has a female thread thereon adapted to engage with the male thread of the first housing. The sleeve nut, when engaged with both the first and second housings, is selectively operated so that the first and second housings are selectively rigid and floating.

In accordance with certain features of the invention, one of the housings of the tool holder is adapted to hold a tool and the other of the housings is connected to a shank for insertion into a rotary mechanism, such as, for example, a drill press, a horizontal milling machine, or a lathe. In accordance to certain features, each of the pockets has a depth from 104 to 112 percent of the radius of the ball bearings.

In accordance with another embodiment of the invention, the novel tool holder includes a member of generally cylindrical shape having a first groove circumferentially disposed near one end thereof and a second groove circumferentially disposed near the other end thereof. The tool holder has a first plurality of ball bearings adapted for cooperation with the first groove and has a second plurality of ball bearings adapted for cooperation with the second groove. The holder further includes a third plurality of ball bearings; a first plurality of retaining means, equal in number to the first plurality of ball bearings; a second plurality of retaining means, equal in number to the second plurality of ball bearings; a first plurality of resilient means, equal in number to the first plurality of ball bearings; and a second plurality of resilient means, equal in number to the second plurality of ball bearings. The tool holder includes a first housing which has an axial passageway from one end to an interior portion thereof. The passageway is adapted to receive a portion of the member which enters the passageway from the one end. The housing has a substantially planar face at its one end, the face having a plurality of pockets corresponding in number to the third plurality. The pockets have a configuration adapted for cooperation with the third plurality of ball bearings. The housing has a plurality of radial orifices equal in number to the first plurality of ball bearings. The orifices extend through to and intersect with the axial passageway. The orifices are adapted to engage the first plurality of retaining means, wherein a single corresponding resilient means resides within each of the orifices. Thus, at each orifice, a resilient means therewithin, held by one of the retaining means, is urged against one of the first plurality of ball bearings, which ball bearings are urged against the first groove of the member. The first housing has a generally cylindrical surface with a male thread thereon. Similarly, a second housing is provided for the tool holder. The second housing has an axial passageway from one end to an interior portion thereof. The passageway receives a portion of the member which enters the passageway from its one end. The second housing has a substantially planar face at its one end, the facing having a plurality of pockets corresponding in number to the third plurality. The pockets of the second housing are disposed in a mirror image configuration to the pockets on the first housing face. The pockets have a configuration adapted for cooperation with the third plurality of ball bearings. The second housing has a plurality of radial orifices, equal in number to the second plurality of ball bearings. The orifices extend through to and intersect with the axial passageway. The orifices engage the second plurality of retaining means, wherein one of the plurality of resilient means resides within each of the orifices. Thus, at each orifice, one of the second plurality of resilient means, held by its associated retaining means, is urged against one of the second plurality of ball bearings which, in turn, is urged against the second groove of the member. The second housing has an exterior truncated conical portion which is tapered in a direction away from the substantially planar face. The tool holder further includes a sleeve nut which has an internal tapered portion adapted to engage with the tapered portion of the housing. The sleeve nut has a female thread adapted to engage with the male thread of the first housing. The sleeve nut has positions whereby the first and the second housings, selectively, are coupled together in a rigid relation and in a floating relation.

In accordance with certain features of the invention, one of the housings is adapted to hold a tool and the other of the housings is coupled to a shank for coupling with a rotary mechanism.

In accordance with one embodiment of this invention, a tool holder can be used with a lathe having a rotating chuck for holding work to be cut and having a tool post and a component tool rest for grasping a tool for cutting such work. This tool holder, in accordance with the invention, has a rigid mode of operation and a floating mode of operation. The tool holder includes a member of generally cylindrical shape having a first groove circumferentially disposed near one end thereof, and a second groove circumferentially disposed near the other end thereof. A first plurality of ball bearings cooperate with the first groove, and a second plurality of ball bearings cooperate with the second groove. A first plurality of retaining means and a first plurality of resilient means are provided, equal in number to the first plurality of ball bearings. Likewise, a second plurality of retaining means and a second plurality of resilient means are provided, equal in number to the second plurality of ball bearings. The tool holder further includes a first housing. The first housing has a first axial passageway from one end to an interior portion thereof. The passageway is adapted to receive a portion of the member, wherein the member enters the passageway from one end of the housing. The first housing further includes a second axial passageway which is aligned with the first passageway. The second axial passageway is located at the opposite end of the housing to a point intermediate the ends of the first housing. The second axial passageway houses a cutting tool. The first housing has an axially disposed slot at the intermediate point, which slot serves as a drift slot for the entrance of a drift key for dislodgement of a cutting tool from the cutting tool holding passageway. The first housing has a substantially planar face at one end thereof. The face has a plurality of pockets, the pockets having a configuration adapted for cooperation with a third plurality of ball bearings. The first housing has a plurality of radial orifices, equal in number to the first plurality of ball bearings. The radial orifices extend through to and intersect with the first axial passageway. These orifices are adapted to engage the first plurality of retaining means wherein one of the first plurality of resilient means resides within each of the orifices. Thus, at each orifice, one of the first plurality of resilient means is held by one of the retaining means, and is urged against one of the ball bearings which in turn is urged against the first groove of the member. The tool holder further includes a second housing. The second housing is in the form of a cam shank and cam shank coupling, having a generally L-shaped cross-section. One end of the second housing is termed a "cam shank coupling" and has a generally large diameter. The opposite end of the second housing is termed a "cam shank" and has a relatively small diameter. The second housing has, at the cam shank coupling, an axial passageway from one end to an interior portion thereof. This axial passageway is adapted to receive a portion of the member, wherein the member enters the passageway from one end of the second housing. Also, at the cam shank coupling, the housing has a substantially planar face at its one end. The face has a plurality of pockets corresponding in number to a third plurality of ball bearings. These pockets are disposed in a mirror image configuration to those pockets on the first housing face. These pockets have a configuration adapted for cooperation with the third plurality of ball bearings. The second housing at the cam shank coupling further has a plurality of radial orifices. The radial orifices are equal in number to the second plurality of ball bearings and extend through to and intersect with the passageway. The orifices are adapted to engage the second plurality of retaining means wherein one of the second plurality of resilient means resides within each of the orifices. Thus, at each orifice, one of the second plurality of resilient means therewithin, held by one of the retaining means, is urged against one of the second plurality of ball bearings, which in turn is urged against the second groove of the member. The second housing, at the cam shank, has a groove disposed circumferentially thereabout. It is noted that one of the aforesaid two housings has a male thread on the external surface thereof. The other of the aforesaid two housings has an external surface from one end to another location on that housing. The external surface is cylindrical from such other location to a point intermediate the other location and one end thereof. The external surface has in inverted truncated conical shape from the intermediate point to one end of the other housing. Thus, the diameter of the other housing at the said one end is greater than the diameter of the intermediate point. The surface at the inverted truncated conical portion has a plurality of disposed flat portions thereon, equal in number to the corresponding radial orifices extending therefrom. A sleeve nut is provided which includes, on the interior surface thereof from one end to the opposite end, an internal tapered portion extending from the proximity of the one end toward an intermediate portion of the sleeve nut. This taper is narrowest at its one end and is adapted to engage with the corresponding inverted truncated conical portion of the other housing when the tool holder is operated in a rigid mode of operation. The sleeve nut includes a circular groove which functions to grant clearance to the truncated conical portion of the other housing when the tool holder is operated in a floating mode of operation. The sleeve nut includes a female thread adapted for engagement with the male thread of the one housing. This tool holder further includes a third housing. The third housing has a first opening therein to facilitate the grasping of such third housing by a tool post of a lathe to a compound tool rest of such lathe. The third housing has a depending portion to act as a stop for abutment against the compound tool rest. The third housing has a first bore therethrough having a central axis, such bore being adapted to receive the cam shank of the second housing. The third housing has a second bore therethrough having a principal axis which lies in a plane perpendicular to the central axis of the first bore, but the first and second bores intersect partially, wherein the respective axes are in a skewed relation. The tool holder further includes cam lock means which are adapted to be housed in the second bore for locking the cam shank in place in such first bore, for restricting the rotary motion of the cam shank. Means are provided in cooperation of the third housing and the circumferential groove of the cam shank for restricting axial motion of the cam shank.

In specific version, a tool holder for use with a lathe having a rotating chuck for holding work to be cut and having a tool post and compound tool rest for grasping the tool for cutting such work is described. The tool holder has a rigid mode of operation and a floating mode of operation. This tool holder, in accordance with a preferred embodiment, includes a member of generally cylindrical shape having a first partially circular groove circumferentially disposed near one end thereof and a second partially circular groove circumferentially disposed near the other end thereof. A first plurality of ball bearings and a second plurality of ball bearings are provided for cooperation with the first and second partially circular grooves, respectively. Similarly, a first plurality of set screws and a first plurality of resilient means are provided, equal in number to the first plurality of ball bearings, and a second plurality of set screws and a second plurality of resilient means are provided equal in number to the second plurality of ball bearings. The tool holder further includes a first housing which has a generally cylindrical configuration with a T-shaped cross-section. One end of the first housing has a relatively large diameter, and the opposite end of the said first housing has a relatively small diameter. This first housing has an axial passageway from one end to an interior portion thereof. The passageway is adapted to receive a portion of the member wherein the member enters the passageway from its one end. Thie first housing has a substantial planar face at its relatively large end. The face has a plurality of pockets corresponding in number to a third plurality of ball bearings. The pockets are disposed equiangularly about a circle concentric with the axis of the passageway. The pockets have a configuration adapted for cooperation with the third plurality of ball bearings. Each of the pockets has a depth from 104% to 112%, of the radius of one of the third plurality of ball bearings. The first housing has a plurality of equiangularly disposed radial orifices, which are equal in number to the first plurality of ball bearings. These orifices extend from the external circumferential surface at the larger diameter portion, through to and intersecting with the axial passageway. These orifices are threaded, at least in part, for engaging the first plurality of set screws so that one of the first plurality of resilient means resides within each of the orifices. Hence, at each orifice, one of the first plurality of set screws is held in place therein. One of the first plurality of resilient means therewithin is urged against one of the ball bearings, which, in turn, is urged against the first partially circular groove of the member. The first housing further has a male thread on the external circumferential surface at the large diameter portion thereof. The thread extends outwardly as a flange where the relatively large diameter abuts the relatively small diameter of the first housing. The first housing has an axial passageway for holding a cutting tool. The passageway extends from the opposite end of the first housing to a point intermediate the ends of the first housing. The first housing further includes an axially disposed slot at the intermediate point to serve as a drift slot for the entrance of a drift key for the dislodgement of a cutting tool from the cutting tool holding passageway. The tool holder further includes a second housing. The second housing is in a form of a cam shank and a cam shank coupling having a generally L-shaped cross-section. One end of the second housing is termed a "cam shank coupling" and has a relatively large diameter. The opposite end of the second housing, termed a "cam shank," has a relatively small diameter. The second housing, at the cam shank coupling, has an axial passageway from one end thereof to an interior portion. The passageway is adapted to receive a portion of the member wherein the member enters the passageway from one end of the second housing. At the relatively large end of the second housing, at the cam shank coupling, is a substantially planar face. The face has a plurality of pockets corresponding in number to the third plurality, equiangularly disposed about a circle which is concentric with the axis of the passageway. The pockets have a configuration adapted for cooperation with the third plurality of ball bearings. Each pocket has a depth from 104% to 112%, of the radius of one of those third plurality of ball bearings. The cam shank coupling has an external surface from one end of the second housing, corresponding to the planar face end of the cam shank coupling, to an opposite end of the cam shank coupling. This external surface is cylindrical from the opposite end of the cam shank coupling to a point intermediate the ends of the cam shank coupling. The external surface has an inverted truncated conical shape from the intermediate point to one end of the coupling, whereby the diameter of the cam shank coupling at one end is greater than the diameter at the intermediate point. The surface of the inverted truncated conical portion has a plurality of equiangularly disposed flat portions thereon. The cam shank coupling has a plurality of equiangularly disposed radial orifices, which are equal in number to the second plurality of ball bearings. These orifices extend from the external circumferentially disposed equiangularly disposed flat portions through to and intersecting with the passageway. The orifices are threaded, at least in part, for engaging the second plurality of set screws, so that one of the second plurality of resilient means resides within each of the orifices. Thus, at each orifice, one of the second plurality of set screws is held in place therein, and one of the second plurality of resilient means therewithin is urged against one of the second plurality of ball bearings, which, in turn, is urged against the second partially circular groove of the member. The second housing has, at the cam shank, a partially circular groove disposed circumferentially thereabout. The tool holder further includes a sleeve nut having a knurled surface on the external circumferential surface thereof and having on the interior surface thereof from one end to an opposite end, a first circular groove adapted to receive an O-ring therein. The sleeve nut further includes an internal taper extending from the O-ring toward an intermediate portion of the sleeve nut. The taper is narrowest at its O-ring groove and is adapted to engage with the corresponding inverted truncated conical portion of the cam shank coupling when the tool holder is operated in a rigid mode of operation. A second circular groove on the sleeve nut serves to grant clearance to the truncated conical portion of the cam shank coupling when the tool holder is operated in a floating mode of operation. The sleeve nut includes a circular rib which mates with the cylindrical surface of the cam shank coupling. A female thread on a sleeve nut is adapted to engage with the male thread of the first housing. A circular groove at the end of the sleeve nut receives a retaining ring. The sleeve nut has selective positions whereby the first and second housings can be selectively rigidly coupled together or coupled together in a floating relationship. A third housing is provided for the tool holder which has a first opening therein to facilitate grasping of the third housing by a tool post of a lathe to a compound tool rest of the lathe. The third housing has a depending portion to act as a stop for abutment against the compound tool rest. The third housing further includes a first bore having a central axis, the bore being adapted to receive the cam shank of the second housing. A first orifice extends from the exterior of the third housing through to and intersecting at right angles with the bore. The orifice is threaded, at least in part, for engaging an additional set screw. An additional resilient means resides within the orifice, and an additional set screw is held in place therein. The additional resilient means therewithin is urged against an additional ball bearing, which, in turn, is urged against the partially circular groove of the cam shank to restrict axial motion of such cam shank. The third housing has a second bore therethrough, having a principal axis lying in a plane perpendicular to the central axis of the first bore. However, the first and second bores have their respective axes in a skewed relation so that the bores intersect but partially. Cam lock means are provided which are housed in the second bore for locking the cam shank in place in the first bore, thus restricting rotary motion of the cam shank.

In accordance with certain features of the invention, the first plurality of ball bearings tend to seek the center of the first partially circular groove of the member and the second plurality of ball bearings tend to seek the center of the second partially circular groove of the member. These tendencies act to jointly tend to urge the first housing and the second housing apart from one another, and also tend to keep the first housing and the second housing axially co-aligned.

In accordance with another embodiment of this invention, the novel tool holder can be used in a drill press, a horizontal milling machine, or in the tail stock of a lathe. The tool holder has a rigid mode of operation and a floating mode of operation. The tool holder, in accordance with this invention, includes a member of generally cylindrical shape having a first groove circumferentially disposed near one end thereof and a second groove circumferentially disposed near the other end thereof. The tool holder includes a first and a second plurality of ball bearings which are adapted for cooperation with the first and second groove, respectively. Similarly, a first and a second plurality of retaining means are provided, equal in number to the first and second plurality of ball bearings, respectively. Also, a first plurality of resilient means and a second plurality of resilient means, equal in number to the first and the second plurality of ball bearings, are likewise provided. This tool holder includes a first housing having a first axial passageway from one end to an interior portion thereof. The passageway is adapted to receive a portion of the member, wherein the member enters the passageway from one end of the housing. The first housing has a substantially planar face at one end, the face having a plurality of pockets. The pockets correspond in number to a third plurality of ball bearings. These pockets have a configuration adapted for cooperation with such ball bearings. The first housing has a plurality of radial orifices extending through to and intersecting with the first axial passageway. These orifices are adapted to engage the first plurality of retaining means so that one of the first plurality of resilient means resides within each of the orifices. Thus, at each orifice, one of the first plurality of resilient means therewithin held by one of the retaining means is urged against one of the ball bearings which in turn is urged against the first partially circular groove of the member. The first housing has a male thread on its external surface. The tool holder further includes a second housing having a first axial passageway from one end thereof to an interior portion. The passageway is adapted to receive a portion of the member wherein the member enters the passageway from one end of the second housing. The second housing has a substantially planar face at one end. The face has a plurality of pockets corresponding in number to the third plurality of ball bearings. These pockets are disposed in a mirror image configuration to those pockets on the first housing face. These pockets have a configuration adapted for cooperation with the third plurality of ball bearings. A second housing includes an external surface from one end thereof, along a relatively large diameter portion to an intermediate location, where the relatively large diameter portion adjoins the relatively small diameter portion of the second housing. The external surface is cylindrical from the intermediate location to a point which is intermediate the intermediate location and the one end. The external surface has an inverted truncated conical shape from the intermediate point to one end of the housing, whereby the diameter of the second housing, at the one end, is greater than the diameter at the intermediate point. The surface at the inverted truncated conical portion has a plurality of flat portions thereon. The second housing further includes a plurality of radial orifices which are equal in number to the second plurality of ball bearings. Such orifices extend from the corresponding flat portions through to and intersecting with the first axial passageway. The orifices are adapted for engaging the second plurality of retaining means so that one of the second plurality of resilient means resides within each of the orifices. Thus, at each orifice, one of the second plurality of resilient means therewithin held by one of said retaining means is urged against one of the second plurality of ball bearings which, in turn, is urged against the second groove of the member. The tool holder further includes a sleeve nut which has, on its interior surface thereof from one end to an opposite end, an internal tapered portion which extends from the proximity of the one end toward an intermediate portion of the sleeve nut. This taper is narrowest near its one end and is adapted to engage with the corresponding inverted truncated conical portion of the second housing when the tool holder is operated in a rigid mode of operation. The sleeve nut includes a second circular groove which serves to grant clearance to the truncated conical portion of the second housing when the tool holder is operated in a floating mode of operation. A female thread is provided on the sleeve nut for engagement with the male thread of the first housing. One of the housings has a second axial passageway in alignment with the first axial passageway so as to hold a cutting tool from the opposite end to a point intermediate the ends of the housing, and also includes an axially disposed slot at the intermediate point. The slot serves as a drift slot for the entrance of a drift key for dislodgement of a cutting tool from the cutting tool holding passageway. The other of the two housings has a tang at the opposite end of such housing.

In accordance with a preferred embodiment of the invention, wherein the tool holder is suitable for direct use in a drill press, a horizontal milling machine, or the tail stock of a lathe, such tool holder having both a rigid mode of operation and a floating mode of operation, can include a member of generally cylindrical shape having a first partially circular groove circumferentially disposed near one end thereof and a second partially circular groove circumferentially disposed near the other end thereof. The tool holder has a first plurality of ball bearings and a second plurality of ball bearings adapted for cooperation with the first and the second partially circular grooves of such member, and further includes a first and a second plurality of set screws, and a first and a second plurality of resilient means for the ball bearings, respectively. The tool holder includes a first housing which has a generally cylindrical configuration with a T-shaped cross-section. One end of the first housing has a relatively large diameter and the opposite end of the first housing has a relatively smaller diameter. The first housing has an axial passageway from one end to an interior portion thereof, and is adapted to receive a portion of the member wherein the member enters the passageway from the one end. The first housing has a substantially planar face at the relatively large end of the housing. The face has a plurality of pockets corresponding in number to a third plurality of ball bearings. The pockets are disposed equiangularly about a circle concentric with the axis of the passageway. The pockets have a configuration adapted for cooperation with the third plurality of ball bearings. Each of the pockets has a depth, preferably, from 104% to 112%, of the radius of the third plurality of ball bearings. The first housing has a plurality of equiangularly disposed radial orifices which are equal in number to the first plurality of ball bearings. These orifices extend from the external circumferential surface at the large diameter portion, through to and intersecting with the axial passageway. The orifices are threaded, at least in part, for engaging the first plurality of set screws so that one of the first plurality of resilient means resides within each of the orifices. Thus, at each orifice, one of the first plurality of set screws is held in place therein and one of the first plurality of resilient means therewithin is urged against one of the ball bearings, which, in turn, is urged against the first partially circular groove of the member. This first housing further has a male thread on its external circumferential surface at its large diameter portion. The thread extends outwardly as a flange where the relatively large diameter abuts the relatively smaller diameter of the housing. The first housing has an axial passageway for holding a cutting tool which extends from the opposite end to a point intermediate the ends of the housing. The first housing further includes an axially disposed slot at the intermediate point, which serves as a drift slot for the entrance of a drift key for dislodgement of a cutting tool from the cutting tool holding passageway. The tool holder further includes a second housing which has a generally cylindrical configuration with a T-shaped cross-section. One end of the second housing has a relatively large diameter, and the opposite end of the second housing has a relatively small diameter. The second housing has an axial passageway from one end to an interior portion thereof. This passageway is adapted to receive a portion of the member, wherein the member enters the passageway from its one end. The second housing has a substantially planar face at the relatively large end. The face has a plurality of pockets corresponding in number to the third plurality which are disposed equiangularly about a circle which is concentric with the axis of the passageway. The pockets have a configuration adapted for cooperation with the third plurality of ball bearings. Each of the pockets has a depth, preferably, from 104% to 112%, of the radius of one of the third plurality of ball bearings. The second housing has an external surface from one end thereof along the relatively large diameter portion of the housing to an intermediate location where the relatively large diameter portion adjoins said relatively small diameter. The external surface is cylindrical from the intermediate location to a point intermediate the intermediate location and the one end. The external surface has an inverted truncated conical shape from the intermediate point to the one end thereof so that the diameter of the cam shank coupling at its one end is greater than the diameter at the intermediate point. The surface at the inverted truncated conical portion has a plurality of equiangularly disposed flat portions thereon. The second housing has a plurality of equiangularly disposed radial orifices which are equal in number to the second plurality of ball bearings. These orifices extend from the external circumferentially oriented equiangularly disposed flat portions through to and intersecting with the passageway. The orifices are threaded, at least in part, to engage the second plurality of set screws, so that one of the second plurality of resilient means resides within each of the orifices. Thus, one of the second plurality of set screws is held in place therein, and one of the second plurality of resilient means is urged against one of the second plurality of ball bearings which, in turn, is urged against the second partially circular groove of the member. The second housing further has a tang at its opposite end. The tool holder further includes a sleeve nut having a knurled surface on the external portion thereof and having, on its interior surface from one end to the opposite end, a first circular groove adapted to receive an O-ring therein. The sleeve nut has an internal taper portion which extends from the O-ring groove toward an intermediate portion thereof, the taper being at its narrowest point at the O-ring groove. The tapered portion is adapted to engage with the corresponding inverted truncated conical portion of the second housing when the tool holder is operated in a rigid mode of operation. The sleeve nut has a second circular groove which serves to grant clearance to the truncated conical portion of the second housing when the tool holder is operated in a floating mode. The sleeve nut has a circular rib adapted to mate with the cylindrical surface of the second housing, and further includes a female thread for engagement with the male thread of the first housing. The sleeve nut further includes a third circular groove for receiving a retaining ring. The sleeve nut has selective positions whereby the first and the second housings can be rigidly coupled together or coupled together in a floating relationship, as desired.

In accordance with a specific feature of the invention, the first plurality of ball bearings of the tool holder tend to seek the center of the first partially circular groove of the member and the second plurality of ball bearings tend to seek the center of the second partially circular groove of the member. These tendencies act to jointly tend to urge the first and the second housings apart from one another and further tend to keep the first and the second housings axially co-aligned.

BRIEF DESCRIPTION OF THE DRAWING

Other objects, advantages, and features of this invention will become more apparent from a reading of the following specification, when read in conjunction with the accompanying drawings, in which:

FIG. 1 is an elevational view, partly in section, of one embodiment of this invention;

FIG. 2 is a sectional view taken along the line 2—2 of FIG. 1;

FIG. 3 is a sectional view taken along the line 3—3 of FIG. 1;

FIG. 4 is a front view, partly in section, of a second embodiment of this invention;

FIG. 5 is a view taken along the line 5—5 of FIG. 4;

FIG. 6 is a view taken along the line 6—6 of FIG. 4 illustrating further, in dotted line format, another position of the mechanism;

DESCRIPTION OF A PREFERRED EMBODIMENT

Figure 8:
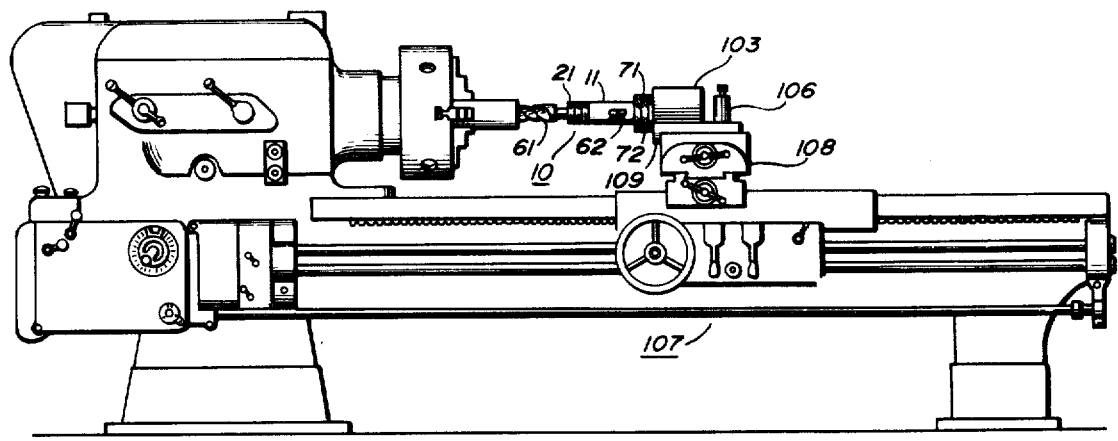
FIG. 8 is an elevational view illustrating the embodiment of FIGS. 4-6 in use in conjunction with a compound tool rest of a lathe.

The tool holder described herein is designed to hold a tool such as a drill, reamer, or the like. Such tool holder is sometimes known in the art as a tool head, but, for clarity, it will be referred to throughout this specification as "tool holder." The tool holder, in accordance with this invention, is, selectively, a rigid tool holder and a floating tool holder. By floating, it is meant that one portion of the holder can be misaligned with another portion of the holder, such that, the two portions can be displaced vertically, horizontally, or angularly with respect to one another, thus, providing for various relative degrees of motion therebetween. Such holders for drill, reamers, and the like are suitable for use in drill presses, horizontal milling machines, the tail stock of a lathe, and in a compound tool rest of a lathe. With respect to a drill press and a horizontal milling machine, the drill, reamer, or the like and its associated tool holder are rotated while the workpiece is kept stationary as by a vice, chuck, or the like. With respect to a lathe, whether it be the tail stock or the compound tool rest, the tool holder and its tool are kept stationary whereas the workpiece is rotated in the chuck of the lathe.

The first embodiment of the applicant's invention is ideally suitable for use in a drill press, the tail stock of a lathe, or a horizontal milling machine.

Referring to FIG. 1, there is illustrated an elevational view of the novel tool holder 10 which is selectively floating or rigid, depending upon how the tool holder 10 is set.

The tool holder 10 includes a first housing 11 and a second housing 12.

The tool holder 10 includes a member 13 of generally cylindrical shape having a first partially circular groove 14 circumferentially disposed near one end 16 thereof and a second partially circular groove 17 circumferentially disposed near the opposite end 18 thereof. The member 13 acts as a rocker shaft.

Both housings 11 and 12 are generally cylindrical in shape and have a T-shaped cross-section, as best shown in FIG. 1. The housing 11 has a relatively large diameter at one end 19 thereof and a relatively short or reduced diameter at the opposite end 21 thereof. The housing 12, in similar fashion, has a correspondingly large diameter at the end 22 with a corresponding short diameter at the opposite end 23 thereof.

Both housings 11 and 12 are formed with axial passageways 24 and 26, respectively, therein which extend from the outer ends of the respective housings 11 and 12 to interior portions thereof.

The end 19 of the housing 11 is formed with a substantially planar face perpendicular to the passageway 24. In like manner, the end 22 of the housing 12 is formed with a planar face perpendicular to the passageway 26.

As best shown in FIG. 3, the planar face 19 is formed with a plurality of recesses 27, 28, 29 about an imaginary circle concentric with the axis of the housing 11. In similar fashion, the housing 12 has its face 22 so formed with pockets.

Each housing 11, 12 includes a plurality, such as three, (one of which 31 for housing 11 is depicted in FIG. 1), of radially directed apertures (see especially FIG. 2). The three apertures of housing 11 are equiangularly spaced near its large planar surface 19. A corresponding set screw 32 is held in place within a screw threading within the respective aperture 31. The set screws 32—32 are urged against resilient means 33—33, respectively, which are housed in the apertures 31—31. The resilient means 33—33 are urged against corresponding ball bearings 34—34 respectively.

The resilient means depicted in the drawings are, preferably, hard rubber, but, alternatively, can be other resilient means such as springs.

The three ball bearings 34 (only one of which is depicted in FIG. 1), spring biased by the set screw-resilient means combination 32-33, are urged against the partially circular groove 14 as depicted in FIG. 1.

Similarly, corresponding set screws and resilient means urge corresponding ball bearings against the partially circular groove 17 of the member 13 as depicted in FIGS. 1 and 2.

The set screws 36, 37, and 38 are located within radial orifices 39, 41, and 42, respectively, of the second housing 12. Set screws 36, 37, and 38 are directed against the resilient means 43, 44, and 46, respectively, which in turn are directed against the corresponding ball bearings 47, 48, and 49.

The ball bearings 47, 48, and 49 are resiliently biased and are urged against the partial circumferential groove 17 of the cylindrical member 13. The set screws 36, 37, and 38 are directed within their corresponding recesses or orifices 39, 41, and 42. The orifices 39, 41, and 42 are equiangularly oriented within the housing 12 and have flattened portions 51, 52, and 53 at their extremities as shown in FIG. 2 (see FIG. 1 with regard to the flattened portion 53).

A plurality of ball bearings 54, 56, and 57 engage the respective pockets 27, 28, and 29 of the housing 11 and further engage the corresponding pockets of the housing 12.

The pockets 27, 28, and 29 of the housing 11, and the corresponding pockets of the housing 12 are of such depth as to range from 104% to 112% of the radius of the corresponding ball bearings 54, 56, and 57.

The first housing 11 has a male thread 58 on its external surface near the end 19 of the housing at the large diameter portion thereof. The male thread 58 extends outwardly as a flange, as best shown in FIG. 1, where a relatively large diameter portion of the housing 11 abuts the relatively smaller diameter portion of the housing 11.

Figure 7:
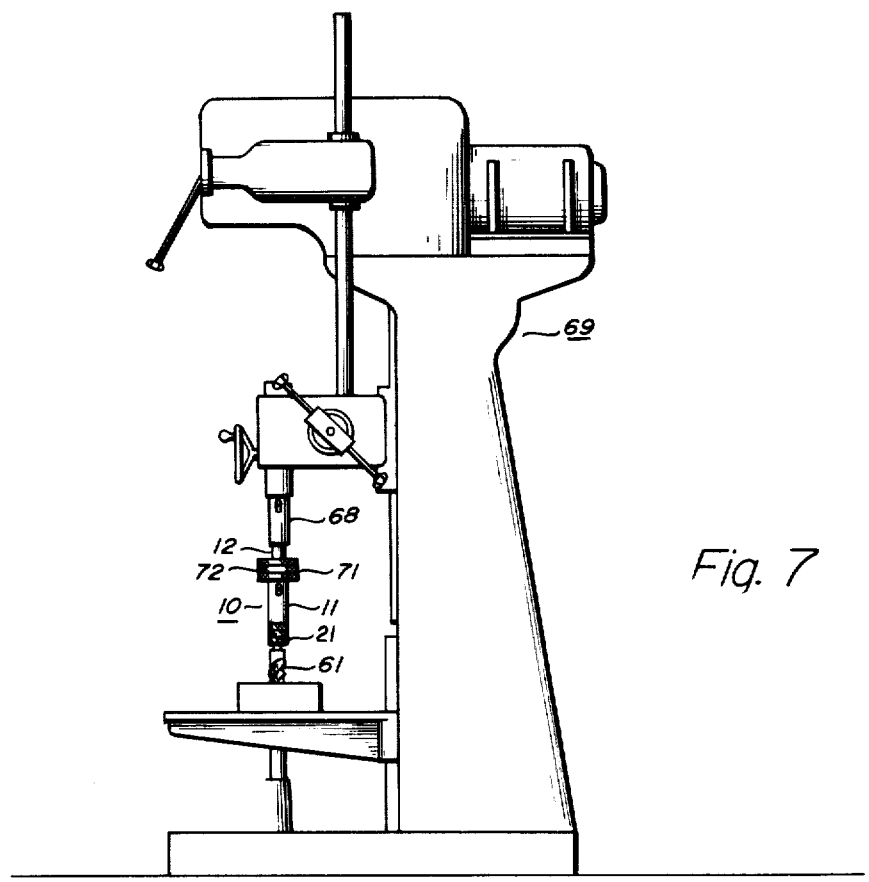
FIG. 7 is an elevational view illustrating the embodiment of FIGS. 1-3 in use in a vertical drill press.

The housing 11 has an axial passageway 59 for holding a cutting tool 61 (FIG. 7). The axial passageway 59 extends from the end 21 of the housing 11 to a location intermediate the end 21 and the end 19 of the housing 11. At such an intermediate location is disposed an axial slot 62 which serves as a drift slot for the entrance of a drift key (not shown) so that a cutting tool, such as the tool 61, can be dislodged from the axial passageway 59.

Referring to FIG. 1, the second housing 12 has an external surface at the relatively large end 22 thereof, extending from its planar face to an intermediate location 63 where the relatively large diameter portion of the second housing adjoins the relatively small diameter portion. The external surface is cylindrical from the intermediate location 62 to a point 64 intermediate the location 63 and the planar end of the second housing. The external surface has an inverted truncated conical shape 66 from the intermediate point 64 to the end of the housing. The diameter of the second housing at the planar end is greater than the diameter at the intermediate point. The flattened portions 51, 52, and 53 are equiangularly disposed about the surface at the inverted truncated conical portion 66 of the second housing.

The second housing 12 is provided with a tang 67 at the opposite end 23 for insertion into the spindle 68 of a drill press 69, for example, as depicted in FIG. 7.

The tool holder 10 includes a sleeve nut 71 having an external knurled surface 72.

The sleeve nut includes a first circular groove 73 adapted to receive an O-ring 74 therein. The sleeve nut 71 includes an internal tapered portion, best shown in FIG. 1, extending from the O-ring groove 73 to an intermediate portion of the sleeve nut 71. This tapered portion is adapted to engage with the corresponding inverted truncated conical portion 66 of the second housing 12 when the tool holder 10 is operated in a rigid mode of operation, as best shown in FIG. 1. The sleeve nut 71 has a circular groove 76 which serves to grant clearance to the truncated conical portion 66 of the housing 12 when the tool holder 10 is operated in a floating mode of operation. The sleeve nut 71 further includes a circular rib 77 which is adapted to mate with the cylindrical surface of the first housing 11. The sleeve nut 71 has a female thread 78 thereon adapted to engage with the male thread 58 of the first housing 11.

Lastly, the sleeve nut 71, optionally, has a circular groove 79 for receiving a retaining ring (not shown in FIG. 1 for clarity of illustration).

As best shown in the drawings, the first plurality of ball bearings 34 tend to seek the center of the first partially circular groove 14 of the member 13 and the second plurality of ball bearings 47, 48, and 49 tend to seek the center of the second partially circular groove 17 of the member 13 due to the action of the resilient means 33, 43, 44, and 46 directed against such ball bearings. Such action of the ball bearings against the member 13 operates to jointly tend to urge the first housing 11 and the second housing 12 apart from one another and further tend to keep the first housing 11 and the second housing 12 axially co-aligned.

In operation, the ball bearings 34—34, urged against the groove 14 of the member 13, together with the corresponding ball bearings 47, 48, and 49 which are urged against the corresponding groove 17 of the member 13 restrain the axial movement, within limits, of the housing 11 with respect to that of the housing 12.

The member 13, essentially a rocker shaft, acts as a floating fulcrum for the two housings 11, 12 of the tool holder 10. The circular grooves 14, 17 receive the radial force applied to the radial ball bearings 34, and 47, 48, 49 and translate this force into an equilateral force.

The ball bearings 54, 56, 57, which are housed between the corresponding pockets of the housings 11 and 12, provide a medium for driving the housing 11 by the housing 12.

When the tool holder 10 is unlocked, by rotating the sleeve nut 71 approximately 6°, the foregoing equilateral force has a spring loaded effect on the sleeve nut 71 and the two housings 11, 12, so that the ball bearings 34 and 47, 48, 49 ride partially on the inner curves of the rocker shaft circular grooves 14, 17, respectively.

Such action also holds the sleeve nut and the two housings 11, 12 in a position equal to a full lock position, until overcome by the greater force that occurs when the cutting tool starts its work cycle. At this point in time, the sleeve nut 71 is backed off manually and the tool holder 10 becomes free floating. The rocker shaft prohibits the disengagement of the two housings 11, 12 when the sleeve nut 71 is removed. The configuration of the set screw, resilient means, and ball bearing combinations are so calculated as to prohibit the ball bearings from being forced into their associated radial orifices far enough for disengagement to take place.

The ball bearings 54, 56, 57, preferably equiangularly spaced in the pockets, are permitted to move axially when the shafts 11 and 12 are out of alignment. These bearings 54, 56, and 57 act as a driving contact between the two housings 11 and 12. These ball bearings 54, 56, 57 can be of the same size or different size than the internal ball bearings 34, 47, 48, 49.

As shown in FIG. 1, ideally, the two housings 11 and 12 are coaligned, in which case, the transmission of torque is along a common axis. However, when the axes of the two housings are not aligned, rotational movement is imparted via the ball bearings 54, 56, and 57.

The biased ball bearings 34 and 47, 48, 49 are equally spaced within their corresponding circumferential grooves 14 and 17, respectively, of the member 13.

As depicted in FIG. 1, the housings 11 and 12 are coupled together in a rigid mode of operation such that the truncated conical portion of the second housing 12 is flush against the corresponding taper portion of the sleeve nut 71. With the sleeve nut 71 tightened, such that its thread 78 is tightened with respect to the male thread 58 of the housing 11 and with the tapered portion of the sleeve flush against the tapered portion of the truncated conical portion of the housing 12, motion of the housing 12 is directly imparted to the housing 11. The housing 12 is in rigid coupling with the housing 11. Hence, with such rigid connection, a drill can be inserted into the passageway 59 and used to initiate the drilling of a hole into a workpiece with a rigid connection assured.

Following the initial drilling of a hole, it is often desired to have a floating drill holder so as to assure that accurate drilling takes place and that the drilled hole be at the desired size and shape. In the event of nonalignment, a drilled hole can occur wherein its upper portion is over-sized.

In order to provide a drill holder which is floating, the operator merely loosens the sleeve nut 71 by a turn or so, so that the tapered portion of the sleeve nut 71 is no longer in contact with the truncated conical portion of the second housing 12.

By so loosening the sleeve nut 71, the tool holder is in its floating condition. The housing 11 can move with respect to the housing 12. Vertical motion, of course, within certain limits, can occur. Horizontal, rotary, and angular displacements of the housing 11 can occur with respect to the housing 12. The truncated conical portion of the housing 12 is free to pivot with respect to the housing 11, and freedom for such motion is provided by the groove 76 sleeve the sleeve nut 71.

Example 1

In the initial embodiment described above, a workpiece is secured to the table of the drill press, the horizontal boring mill, or a table of a like machine tool. Normally, the workpiece is stationary, and the tool or tools rotate perpendicular to the workface.

The tool holder 10, in a locked position, is installed in the socket of the machine tool spindle 68 in a conventional manner. The proper sized drill is installed into the drill holder at the passageway 59, conventionally.

The sleeve nut 71 of the tool holder 10 is rotated counterclockwise, manually, approximately 6° to unlock the tool head. When so done, a distinct click is heard when the unlocking occurs due to the built-in lost motion of the drive ball bearings in their respective pockets, moving counterclockwise. In this position, the rocker shaft tension holds the sleeve nut and the two housings of the tool holder centralized with the machine tool spindle 68 until contact is made with a center punch mark on the workpiece.

At contact, a centralization of the drill point and center punch mark occurs. The drill is fed into the workpiece until the drill point is buried. The spindle rotation is halted and the sleeve nut is then turned, manually, counterclockwise, 90° or more, to a floating position. The machine tool spindle is then restarted and feeding of the tool is then enlarged. By so doing, the drill penetrates the workpiece perpendicular to the near face of the workpiece without the lands of the drill binding or galling on the hole periphery.

Example 2

In the absence of a center punch mark on the workpiece working face, the machine tool spindle is oriented in a desired position. The tool head should be in a full-locked position until the drill point is buried into the workpiece.

Then, the spindle is stopped and the sleeve nut is unlocked 90° or more.

The machine tool spindle is restarted and the feed is engaged to complete the drilling cycle, as described in Example No. 1, above.

Example 3

When the machine tool is numerically controlled and operated, as such, rather than manually controlled, and precision located holes are desired, the holes can be spotted with the tool holder in full lock position, using a centering drill to spot all holes.

After spotting, the centering drill is removed, and the sleeve nut is loosened 90° or more to a position that partly allows the drill point to enter the 60° spotted opening machined by the centering drill.

As the work cycle starts, the tool holder automatically precision locates the drill point.

Spotting is a normal method used to start precision located drill holes with numerically controlled machine tools. No additional work is necessary, but the work quality is improved and the tool life is increased.

Example 4

Drilling, reaming, and similar related machine operations, at first glance, may appear to be work of a simple character when performed in an engine lathe or like machine tool. This operation can be carried forward by installing the appropriate tool in the quill of a lathe tail stock. For descriptive purposes, a drill is selected.

Of all small tools, drills are the most abused tool used for machining. The drill shank is an annealed state and is subject to nicks and burrs from rough handling. Nicks and burrs can cause mis-alignment when the drill shank is installed in any socket or, in this example, the tail stock quill which holds the drill shank by the friction of a slow taper only.

With the workpiece held in the lathe chuck and rotating, the drill is fed to the workpiece by manually turning the tail stock handwheel of the lathe.

Any misalignment causes the drill to bind, producing frictional heat in the hole and, when severe enough, the drill breaks or cuts fast and rotates with the workpiece.

When a drill breaks in the workpiece it is difficult to remove and, hence, produces a safety hazard.

When the drill cuts fast and rotates with the workpiece, damage by scoring can take place in the tail stock quill socket causing an additional misalignment factor.

The tool holder, as described in this specification overcomes misalignment problems when used in the following manner:

The tool holder is installed in a tail stock quill of a lathe in a conventional manner. The drill is installed in the tool holder conventionally. If a center punch mark is on the work face of the workpiece, the sleeve nut is unlocked approximately 6°. At this point, a distinct click (as explained in Example No. 1) occurs. The drill is fed manually by turning the tail stock handwheel until the drill point is buried.

The tool holder is backed off slightly and unlocked by turning the sleeve nut, until the drill point is approximately one-third of the drill's diameter below the axis of the spotted hole. The drilling is resumed and the drill is then fed into the workpiece manually.

As will be apparent to those skilled in the art, less effort is required on behalf of the operator, since the drill axis automatically moves to the workpiece axis. Less heat is generated when the drill lands do not bind on the periphery of the drill hole. The finish of the hole, the hole size, and machining time are improved by the centralization that applicant's tool novel holder provides.

When no center punch mark is on the workpiece, the tool holder is kept at the full lock position until the drill point is buried into the workpiece. The procedure then follows as that above.

DESCRIPTION OF AN ALTERNATE EMBODIMENT

The alternate embodiment described hereinafter, as shown in FIGS. 4, 5, and 6, is specifically adapted for use with a compound tool rest of an engine lathe and the tool post thereof, as best shown in FIG. 8.

Portions of such an alternate embodiment, which are in common with the first embodiment, are represented by like reference numerals.

As shown in FIG. 4, the first housing 11 has a tool 61 extending from its passageway 59, not shown. The housing 11 has a drift slot 62 similar to that of FIG. 1. Likewise, the housing 11 has a male thread 58 at its large diameter portion thereof. In all respects, the housing 11 of FIG. 4 corresponds with that of the embodiment shown in FIG. 1.

The second housing of the alternate embodiment shown in FIG. 4 is designated by the numeral 100. The second housing 100 includes two major portions. The large diameter portion 101, hereinafter termed the "cam shank coupling," and the small diameter portion 102, hereinafter termed the "cam shank." The cam shank 102 is coupled with the cam shank coupling 101 in an L-shaped manner, as best shown in FIG. 4. The cam shank coupling 102 is identical in all respects to the corresponding portion of the second housing 12 of FIG. 1 from the end portion 63 onto the face 19, as shown in FIGS. 1 and 4.

In similar fashion, the sleeve nut 71 of FIG. 4 corresponds identically to the like component shown in FIG. 1.

The embodiment shown in FIG. 4, specifically designed for use with the compound tool rest of the lathe, includes a third housing 103. The third housing 103 has an opening 104 therein to facilitate the grasping of the third housing 103 by a tool post 106 of the lathe 107 to a compound tool rest 108 of the lathe 107 as shown in FIG. 8.

The third housing 103 has a collar or depending portion 109 which acts as a stop for abutment against the compound tool rest 108, as shown in FIG. 8.

The third housing 103 further has a first bore 111 therethrough having a central axis. The bore 111 is adapted to receive the cam shank 102 of the second housing 100 therewithin.

The third housing 103 has an orifice 112 which extends from the exterior thereof through to and intersecting at right angles with the bore 111. The orifice 112 is threaded, at least in part, so as to receive a set screw 113. The set screw, held in place by the threaded portion of the orifice 112, holds resilient means (such as hard rubber) 114 in place, so as to urge a ball bearing 116 against a partially circular groove 117 of the cam shank 102. The resiliently biased ball bearing 116, operating against the groove 117 of the cam shank 102, restricts axial motion of the cam shank 102 with respect to the third housing 103.

The third housing 103 has a second bore 118 therethrough having a principal axis which lies in a plane perpendicular to the central axis of the bore 111. The first and the second bores intersect partially, but have their respective axes in a skewed relation as shown in FIGS. 4 and 5.

Referring to FIG. 5, cam lock means 119 are provided in the second bore 118 for locking the cam shank 102 in place in the first bore 111 for restricting rotary motion of the camm shank 100. The cam lock means, conventionally, is shown as two halves 120 and 121, the half 121 including an internal threaded portion and the cam half 120 being unthreaded, so that a suitable bolt 122 can couple the two together by means of a conventional washer 123.

Example 5

When the tool holder is assembled with the cam shank and housing arrangement, and installed on the compound tool rest of an engine lathe, or like machine tool, as described in the latter embodiment above, drilling, reaming, and the like can be performed by using the machine tool power feeds.

The drilling of a hole is again used as an example. The workpiece should be prepared for drilling prior to the installation of the assembled tool holder. The axis of the workpiece drill point can be located by anyone skilled in the art by using precision measuring tools.

To attach the tool holder, including a third housing, to the compound tool rest, the procedure is carried out as follows: The compound tool rest T slot is set parallel to the machine tool "ways." The top of the compound tool rest T slot acts as V-block support for round objects. The tool post of the lathe is stripped of all conventional equipment, except that the T-block in the compound tool rest T-slot and the tool post are assembled with the T-block.

The tool holder, including the third housing, is positioned on top of the compound tool rest T-slot by placing the opening 104 in the third housing 103 over and around the tool post 106. The assembly is then lowered until it rests on the compound tool rest T-slot with the front collar 109 of the third housing 103 firmly against the end of the T-slot.

A rectangular screw plate of appropriate dimensions (not shown) is installed between the tool post screw and flat at the top of the housing mounting hole 104. The tool post screw is tightened with a tool post wrench to complete the set-up of the tool post housing on the compound tool rest T-slot.

A drill is installed into the tool holder socket 59 in the conventional manner. The cam shank lock 119 is loosened until the tool holder can be rotated manually, but with enough resistance to hold the free weight of the tool head.

The carriage cross-slide, the compound tool rest, and the tool holder, as a unit, are positioned toward the machine tool axis. By grasping the sleeve nut and by turning the tool holder clockwise or counterclockwise, the tool holder is raised or lowered toward the machine tool axis (see FIG. 6 which illustrates two positions). As the unit is manually being fed, it is apparent to anybody skilled in the art, that the drill is centered at the machine tool axis. Upon centering, the cam shank lock is firmly tightened.

Machine tool feeds and speeds are set. The starting feed should be about one-third of the conventional drilling feed.

The tool holder is unlocked, approximately 6°, with the drill in contact with the center punch mark. Machine tool rotation is started and longitudinal feed is engaged.

When the drill point is buried, disengage the feed, stop the machine tool rotation, and back away the drill slightly.

Loosen the sleeve nut until the drill point is approximately one-third of the drill's diameter below the axis of the spotted hole. This drill position allows the drill to enter the drill hole without manual guidance.

A vibrating motion occurs upon the drill entering and leaving the workpiece that clears the drill of chips and frees the operator's hands from hazard of cleaning chips.

After the drilling cycle is completed, the tool holder is reset to the 6° unlocked position, and is then ready, with no further adjustment, for the next workpiece.

When it is desired to use a step hole with larger size drills, the tool holder is locked when removing and installing drills. The drilling cycle is repeated as explained hereinabove.

The knurling of the sleeve nut and socket end of the tool head is a desirable feature that permits the operator to position the tool holder with a first and safe grip.

What is claimed is:

1. A tool holder having a rigid mode of operation and a floating mode of operation for use with a lathe having a rotating chuck for holding work to be cut and having a tool post and compound tool rest for grasping a tool for cutting said work, said tool holder comprising
   a. a member of generally cylindrical shape having a first groove circumferentially disposed near one end thereof and a second groove circumferentially disposed near the other end thereof;
   b. a first plurality of ball bearings adapted for cooperation with said first groove;
   c. a second plurality of ball bearings adapted for cooperation with said second groove;
   d. a third plurality of ball bearings;
   e. a first plurality of retaining means, equal in number to said first plurality of ball bearings;
   f. a second plurality of retaining means, equal in number to said second plurality of ball bearings;
   g. a first plurality of resilient means, equal in number to said first plurality of ball bearings;
   h. a second plurality of resilient means, equal in number to said second plurality of ball bearings;
   i. a first housing
      1. having a first axial passageway from one end to an interior portion thereof, said passageway being adapted to receive a portion of said member wherein said member enters said passageway from said one end of said first housing;
      2. having a second axial passageway aligned with said first passageway, from said opposite end to a point intermediate said ends of said first housing, for holding a cutting tool;

3. having an axially disposed slot at said intermediate point, said slot serving as a drift slot for the entrance of a drift key for dislodgement of a cutting tool from said cutting tool holding passageway;
4. having a substantially planar face at said one end of said first housing, said face having a plurality of pockets, corresponding in number to said third plurality, said pockets having a configuration adapted for cooperation with said third plurality of ball bearings;
5. having a plurality of radial orifices, and equal in number to said first plurality of ball bearings, extending through to and intersecting with said first axial passageway, said orifices being adapted for engaging said first plurality of retaining means, wherein one of said first plurality of resilient means resides within each of said orifices, whereby, at each orifice, one of said first plurality of resilient means therewithin, held by one of said retaining means, is urged against one of said ball bearings, which, in turn, is urged against said first groove of said member;

j. a second housing in the form of a cam shank and cam shank coupling having a generally L-shaped cross-section, wherein one end of said second housing, hereinafter termed "cam shank coupling," has a relatively large diameter and the opposite end of said second housing, hereinafter termed "cam shank" has a relatively small diameter, said second housing,
1. at said cam shank coupling,
   A. having an axial passageway from said one end thereof to an interior portion thereof, said passageway being adapted to receive a portion of said member wherein said member enters said passageway from said one end of said second housing;
   B. having a substantially planar face at said one end of said second housing, said face having a plurality of pockets, corresponding in number to said third plurality, disposed in a mirror image configuration to those pockets on said first housing face, said pockets having a configuration adapted for cooperation with said third plurality of ball bearings;
   C. having a plurality of radial orifices, and equal in number to said second plurality of ball bearings, extending through to and intersecting with said passageway, said orifices being adapted for engaging said second plurality of retaining means, wherein one of said second plurality of resilient means resides within each of said orifices, whereby, at each orifice, one of said second plurality of resilient means therewithin, held by one of said retaining means, is urged against one of said second plurality of ball bearings which, in turn, is urged against said second groove of said member; and
2. at said cam shank
having a groove disposed circumferentially thereabout;
one of the aforesaid two housings having a male thread on the external surface thereof; the other of the aforesaid two housings having an external surface from said one end thereof to another location on said other housing, said external surface being cylindrical from said other location to a point intermediate said other location and said one end thereof, and said external surface having an inverted truncated conical shape from said intermediate point to said one end of said other housing, whereby the diameter of said other housing at said one end is greater than the diameter at said intermediate point, said surface at the inverted truncated conical portion having a plurality of disposed flat portions thereon equal in number to corresponding radial orifices extending therefrom;

k. sleeve nut means including on the interior surface thereof, from one end of the sleeve nut means to an opposite end thereof,
1. an internal taper portions extending from the proximity of said one end toward an intermediate portion of said sleeve nut means, said taper being at its narrowest point near said one end, said tapered portion being adapted to engage with the corresponding inverted truncated conical portion of said other housing when said tool holder is operated in a rigid mode of operation;
2. a circular groove, said groove serving a function to grant clearance to the truncated conical portion of said other housing when said tool holder is operated in a floating mode of operation; and
3. a female thread adapted for engagement with the male thread of said one housing;

l. a third housing
1. having a first opening therein to facilitate grasping of said third housing by a tool post of a lathe to a compound tool rest of said lathe;
2. having a depending portion to act as a stop for abutment against said compound tool rest;
3. having a first bore therethrough having a central axis, said bore being adapted to receive said cam shank of said second housing therewithin;
4. having a second bore therethrough having a principal axis, said principal axis lying in a plane perpendicular to said central axis of said first bore, said first and second bores intersecting partially but having their respective axes in a skewed relation;

m. cam lock means adapted to be housed in said second bore for locking said cam shank in place in said first bore, for restricting rotary motion of said cam shank; and n. means in cooperation with said third housing and said circumferential groove of said cam shank for restricting axial motion of said cam shank.

2. A tool holder having a rigid mode of operation and a floating mode of operation for use with a lathe having a rotating chuck for holding work to be cut and having a tool post and compound tool rest for grasping a tool for cutting said work, said tool holder comprising
a. a member of generally cylindrical shape having a first partially circular groove circumferentially disposed near one end thereof and a second partially circular groove circumferentailly disposed near the other end theroef;
b. a first plurality of ball bearings adapted for cooperation with said first partially circular groove;
c. a second plurality of ball bearings adapted for cooperation with said second partially circular groove;
d. a third plurality of ball bearings;

e. a first plurality of set screws, equal in number to said first plurality of ball bearings;
f. a second plurality of set screws, equal in number to said second plurality of ball bearings;
g. a first plurality of resilient means, equal in number to said first plurality of ball bearings;
h. a second plurality of resilient means, equal in number to said second plurality of ball bearings;
i. a first housing having a generally cylindrical configuration with a T-shaped cross-section, wherein one end of said first housing has a relatively large diameter and the opposite end of the said first housing has a relatively smaller diameter, said first housing
 1. having an axial passageway from said one end to an interior portion thereof, said passageway being adapted to receive a portion of said member wherein said member enters said passageway from said one end of said first housing;
 2. having a substantially planar face at the said relatively large end of said first housing, said face having a plurality of pockets, corresponding in number to said third plurality, equiangularly disposed about a circle concentric with the axis of said passageway, said pockets having a configuration adapted for cooperation with said third plurality of ball bearings, each of said pockets having a depth from 104 percent to 112 percent of the radius of one of said third plurality of ball bearings;
 3. having a plurality of equiangularly disposed radial orifices, and equal in number to said first plurality of ball bearings, extending from the external circumferential surface at the large diameter portion through to and intersecting with said axial passageway, said orifices being threaded, at least in part, for engaging said first plurality of set screws, wherein one of said first plurality of resilient means resides within each of said orifices, whereby, at each orifice,
 one of said first plurality of set screws is held in place therein, and one of said first plurality of resilient means therewithin is urged against one of said ball bearings, which, in turn, is urged against said first partially circular groove of said member;
 4. having a male thread, on the external circumferential surface at the large diameter portion thereof, extending outwardly as a flange where said relatively large diameter abuts said relatively smaller diameter of said first housing;
 5. having an axial passageway, for holding a cutting tool, from said opposite end to a point intermediate said ends of said first housing; and
 6. having an axially disposed slot at said intermediate point, said slot serving as a drift slot for the entrance of a drift key for dislodgement of a cutting tool from said cutting tool holding passageway;
j. a second housing in the form of a cam shank and cam shank coupling having a generally L-shaped cross-section, wherein one end of said second housing, hereinafter termed "cam shank coupling," has a relatively large diameter and the opposite end of said second housing, hereinafter termed "cam shank," has a relatively small diameter, said second housing,
 1. at said cam shank coupling,
  A. having a axial passageway from said one end thereof to an interior portion thereof, said passageway being adapted to receive a portion of said member wherein said member enters said passageway from said one end of said second housing;
  B. having a substantially planar face at the said relatively large end of said second housing, said face having a plurality of pockets, corresponding in number to said third plurality, equiangularly disposed about a circle, concentric with the axis of said passageway, said pockets having a configuration adapted for cooperation with said third plurality of ball bearings, each of said pockets having a depth from 104 percent to 112 percent of the radius of one of said third plurality of ball bearings;
  C. having an external surface from said one end of said second housing, corresponding to the planar face end of said cam shank coupling, to an opposite end of said cam shank coupling, said external surface being cylindrical from said opposite end of said cam shank coupling to a point intermediate the ends of said cam shank coupling, and said external surface having an inverted truncated conical shape from said intermediate point to said one end of said cam shank coupling, whereby the diameter of said cam shank coupling at said one end is greater than the diameter at said intermediate point, said surface at the inverted truncated conical portion having a plurality of equiangularly disposed flat portions thereon;
  D. having a plurality of equiangularly disposed radial orifices, and equal in number to said second plurality of ball bearings, extending from the external circumferentially disposed equiangularly disposed flat portions through to and intersecting with said passageway, said orifices being threaded, at least in part, for engaging said second plurality of set screws, wherein one of said second plurality of resilient means resides within each of said orifices, whereby, at each orifice,
  one of said second plurality of set screws is held in place therein, and one of said second plurality of resilient means therewithin is urged against one of said second plurality of ball bearings, which, in turn, is urged against said second partially circular groove of said member; and
 2. at said cam shank,
  having a partially circular groove disposed circumferentially thereabout;
k. an O-ring
l. a retaining ring;
m. sleeve nut means having a knurled surface on the external circumferential surface thereof, and having on the interior surface thereof, from one end of the sleeve nut means to the opposite end thereof,
 1. a first circular groove adapted to receive said O-ring therein;
 2. an internal taper portion extending from said O-ring groove toward an intermediate portion of said sleeve nut means, said taper being at its narrowest point at said O-ring groove, said tapered portion being adapted to engage with the corresponding inverted truncated conical portion of said cam shank coupling when said tool holder is operated in a rigid mode of operation;

3. a second circular groove, said second groove serving a function to grant clearance to the truncated conical portion of the cam shank coupling when said tool holder is operated in a floating mode of operation, 4. a circular rib adapted to mate with the cylindrical surface of said cam shank coupling;

5. a female thread adapted for engagement with the male thread of said first housing; and 6. a circular groove for receiving said retaining ring, said sleeve nut means having selective positions whereby said first housing and said second housing, selectively, can be rigidly coupled together or coupled together in a floating relationship;

n. an additional ball bearing;
o. an additional set screw;
p. an additional resilient means;
q. a third housing 1. having a first opening therein to facilitate grasping of said third housing by a tool post of a lathe to a compound tool rest of said lathe;

2. having a depending portion to act as a stop for abutment against said compound tool rest;

3. having a first bore therethrough having a central axis, said bore being adapted to receive said cam shank of said second housing therewithin;

4. having an orifice extending from the exterior of said third housing through to and intersecting at right angles with said bore, said orifice being threaded, at least in part, for engaging said additional set screw, wherein said additional resilient means resides within said orifice, and whereby said additional set screw is held in place therein, and said additional resilient means therewithin is urged against said additional ball bearing, which, in turn, is urged against said partially circular groove of said cam shank for restricting axial motion thereof; and 5. having a second bore therethrough having a principal axis, said principal axis lying in a plane perpendicular to said central axis of said first bore, said first and second bores intersecting partially but having their respective axes in a skewed relation; and r. cam lock means adapted to be housed in said second bore for locking said cam shank in place in said first bore for restricting rotary motion of said cam shank.

3. The tool holder as recited in claim 2 wherein said first plurality of ball bearings tend to seek the center of said first partially circular groove of said member, and said second plurality of ball bearings tend to seek the center of said second partially circular groove of said member, so as to jointly tend to urge said first housing and said second housing apart from one another and tend to keep said first housing and said second housing axially co-aligned.

4. A tool holder having a rigid mode of operation and a floating mode of operation, said tool holder comprising a. a member of generally cylindrical shape having a first groove circumferentially disposed near one end thereof and a second groove circumferentially disposed near the other end thereof;

b. a first plurality of ball bearings adapted for cooperation with said first groove;

c. a second plurality of ball bearings adapted for cooperation with said second groove;

d. a third plurality of ball bearings;

e. a first plurality of retaining means, equal in number to said first plurality of ball bearings;

f. a second plurality of retaining means, equal in number to said second plurality of ball bearings;

g. a first plurality of resilient means, equal in number to said first plurality of ball bearings;

h. a second plurality of resilient means, equal in number to said second plurality of ball bearings;

i. a first housing 1. having a first axial passageway from one end to an interior portion thereof, said passageway being adapted to receive a portion of said member wherein said member enters said passageway from said one end of said first housing;

2. having a substantially planar face at said one end of said first housing, said face having a plurality of pockets, corresponding in number to said third plurality, said pockets having a configuration adapted for cooperation with said third plurality of ball bearings;

3. having a plurality of radial orifices, and equal in number to said first plurality of ball bearings, extending through to and intersecting with said first axial passageway, said orifices being adapted for engaging said first plurality of retaining means, wherein one of said first plurality of resilient means resides within each of said orifices, whereby, at each orifice, one of said first plurality of resilient means therewithin, held by one of said retaining means, is urged against one of said ball bearings, which, in turn, is urged against said first partially circular groove of said member;

4. having a male thread on the external surface thereof;

j. a second housing 1. having a first axial passageway from one end thereof to an interior portion thereof, said passageway being adapted to receive a portion of said member wherein said member enters said passageway from said one end of said second housing;

2. having a substantially planar face at said one end of said second housing, said face having a plurality of pockets, corresponding in number to said third plurality, disposed in a mirror image configuration to those pockets on said first housing face, said pockets having a configuration adapted for cooperation with said third plurality of ball bearings;

3. having an external surface from said one end of said second housing along a relatively large diameter portion thereof to an intermediate location where the relatively large diameter portion adjoins a relatively small diameter portion of said second housing, said external surface being cylindrical from said intermediate location to a point intermediate said intermediate location and said one end, and said external surface having an inverted truncated conical shape from said intermediate point to said one end of said second housing, whereby the diameter of said second housing at said one end is greater than the diameter at said intermediate point, said surface at the inverted truncated conical portion having a plurality of flat portions thereon.

4. having a plurality of radial orifices, and equal in number to said second plurality of ball bearings, extending from the corresponding said flat portions through to and intersecting with said first axial passageway, said orifices being adapted for engaging said second plurality of retaining means, wherein one of said second plurality of resilient means resides within each of said orifices, whereby, at each orifice, one of said second plurality of resilient means therewithin, held by one of said retaining means, is urged against one of said second plurality of ball bearings, which, in turn, is urged against said second groove of said member and k. sleeve nut means including on the interior surface thereof, from one end of the sleeve nut means to an opposite end thereof, 1. an internal taper portion extending from the proximity of said one end toward an intermediate portion of said sleeve nut means, said taper being at its narrowest point near said one end, said tapered portion being adapted to engage with the corresponding inverted truncated conical portion of said second housing when said tool holder is operated in a rigid mode of operation;
2. a circular groove, said groove serving a function to grant clearance to the truncated conical portion of said second housing when said tool holder is operated in a floating mode of operation; and
3. a female thread adapted for engagement with the male thread of said first housing;

wherein one of said housings 1. has a second axial passageway in alignment with said first axial passageway, for holding a cutting tool, from said opposite end to a point intermediate said ends of said one housing; and
2. has an axially disposed slot at said intermediate point, said slot serving as a drift slot for the entrance of a drift key for dislodgement of a cutting tool from said cutting tool holding passageway; and wherein the other of said housings has a tang at said opposite end of said other housing.

5. A tool holder having a rigid mode of operation and a floating mode of operation, said tool holder comprising a. a member of generally cylindrical shape having a first partially circular groove circumferentially disposed near one end thereof and a second partially circular groove circumferentially disposed near the other end thereof;
b. a first plurality of ball bearings adapted for cooperation with said first partially circular groove;
c. a second plurality of ball bearings adapted for cooperation with said second partially circular groove;
d. a third plurality of ball bearings;
e. a first plurality of set screws, equal in number to said first plurality of ball bearings;
f. a second plurality of set screws, equal in number to said second plurality of ball bearings;
g. a first plurality of resilient means, equal in number to said first plurality of ball bearings;
h. a second plurality of resilient means, equal in number to said second plurality of ball bearings;
i. a first housing having a generally cylindrical configuration with a T-shaped cross-section, wherein one end of said first housing has a relatively large diameter and the opposite end of the said first housing has a relatively smaller diameter, said first housing 1. having an axial passageway from said one end to an interior portion thereof, said passageway being adapted to receive a portion of said member wherein said member enters said passageway from said one end of said first housing;
2. having a substantially planar face at the said relatively large end of said first housing, said face having a plurality of pockets, corresponding in number to said third plurality, equiangularly disposed about a circle concentric with the axis of said passageway, said pockets having a configuration adapted for cooperation with said third plurality of ball bearings, each of said pockets having a depth from 104 percent to 112 percent of the radius of one of said third plurality of ball bearings;
3. having a plurality of equiangularly disposed radial orifices, and equal in number to said first plurality of ball bearings, extending from the external circumferential surface at the large diameter portion through to and intersecting with said axial passageway, said orifices being threaded, at least in part, for engaging said first plurality of set screws, wherein one of said first plurality of resilient means resides within each of said orifices, whereby, at each orifice, one of said first plurality of set screws is held in place therein, and one of said first plurality of resilient means therewithin is urged against one of said ball bearings, which, in turn, is urged against said first partially circular groove of said member;

4. having a male thread, on the external circumferential surface at the large diameter portion thereof, extending outwardly as a flange where said relatively large diameter abuts said relatively smaller diameter of said first housing;
5. having an axial passageway, for holding a cutting tool, from said opposite end to a point intermediate said ends of said first housing; and
6. having an axially disposed slot at said intermediate point, said slot serving as a drift slot for the entrance of a drift key for dislodgement of a cutting tool from said cutting tool holding passageway;

j. a second housing having a generally cylindrical configuration with a T-shaped cross-section, wherein one end of said second housing has a relatively large diameter and the opposite end of said second housing has a relatively small diameter, said second housing, 1. having an axial passageway from said one end thereof to an interior portion thereof, said passageway being adapted to receive a portion of said member wherein said member enters said passageway from said one end of said second housing;
2. having a substantially planar face at the said relatively large end of said second housing, said face having a plurality of pockets, corresponding in number to said third plurality, equiangularly disposed about a circle, concentric with the axis of said passageway, said pockets having a configuration adapted for cooperation with said third plurality of ball bearings, each of said pockets having a depth from 104 percent to 112 percent of the radius of one of said third plurality of ball bearings;

3. having an external surface from said one of said second housing along the relatively large diameter portion of said second housing to an intermediate location where the relatively large diameter portion adjoins said relatively small diameter, said external surface being cylindrical from said intermediate location to a point intermediate said intermediate location and said one end, and said external surface having an inverted truncated conical shape from said intermediate point to said one end of said second housing, whereby the diameter of said second housing at said one end is greater than the diameter at said intermediate point, said surface at the inverted truncated conical portion having a plurality of equiangularly disposed flat portions thereon;

4. having a plurality of equiangularly disposed radial orifices, and equal in number to said second plurality of ball bearings, extending from the external circumferentially disposed equiangularly disposed flat portions through to and intersecting with said passageway, said orifice being threaded, at least in part, for engaging said second plurality of set screws, wherein one of said second plurality of resilient means resides within each of said orifices, whereby, at each orifice, one of said second plurality of set screws is held in place therein, and one of said second plurality of resilient means therewithin is urged against one of said second plurality of ball bearings, which, in turn, is urged against said second partially circular groove of said member; and 5. having a tang at said opposite end of said second housing;

k. an O-ring;

l. a retaining ring; and m. sleeve nut means having a knurled surface on the external circumferential surface thereof, and having on the interior surface thereof, from one end of the sleeve nut means to the opposite end thereof, 1. a first circular groove adapted to receive said O-ring therein;

2. an internal taper portion extending from said O-ring groove toward an intermediate portion of said sleeve nut means, said taper being at its narrowest point at said O-ring groove, said tapered portion being adapted to engage with the corresponding inverted truncated conical portion of said second housing when said tool holder is operated in a rigid mode of operation;

3. a second circular groove, said second groove serving a function to grant clearance to the truncated conical portion of said second housing when said tool holder is operated in a floating mode of operation;

4. a circular rib adapted to mate with the cylindrical surface of said second housing;

5. a female thread adapted for engagement with the male thread of said first housing; and 6. a third circular groove for receiving said retaining ring, said sleeve nut means having selective positions whereby said first housing and said second housing, selectively, can be rigidly coupled together or coupled together in a floating relationship.

6. The tool holder as recited in claim 5 wherein said first plurality of ball bearings tend to seek the center of said first partially circular groove of said member, and said second plurality of ball bearings tend to seek the center of said second partially circular groove of said member, so as to jointly tend to urge said first housing and said second housing apart from one another and tend to keep the said first housing and said second housing axially co-aligned.

* * * * *